Feb. 24, 1925.
F. M. BLAKE
1,527,625
SAFETY APPLIANCE FOR MOTOR VEHICLES
Filed Sept. 8, 1922   2 Sheets-Sheet 1
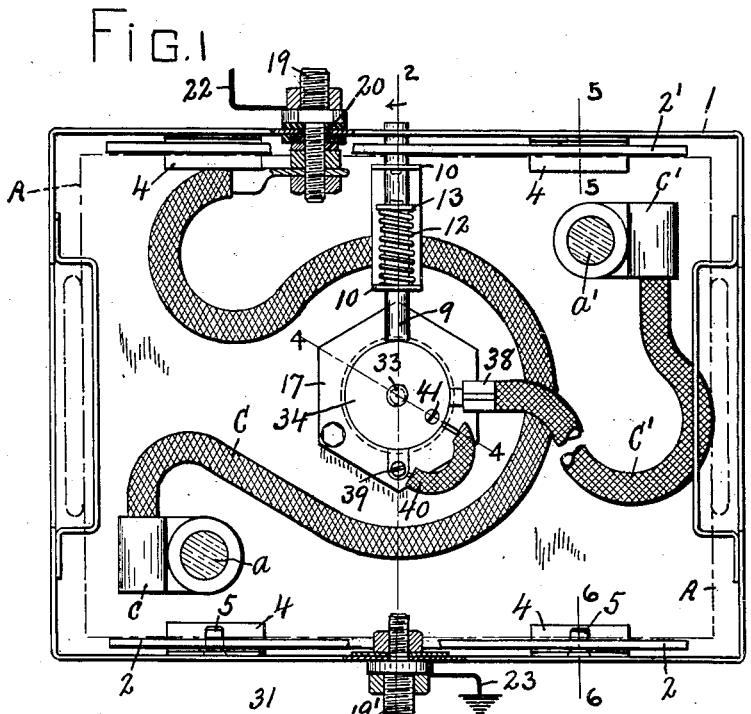
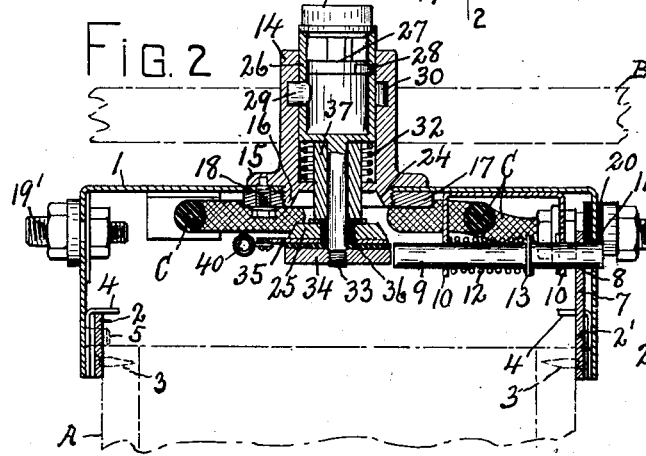
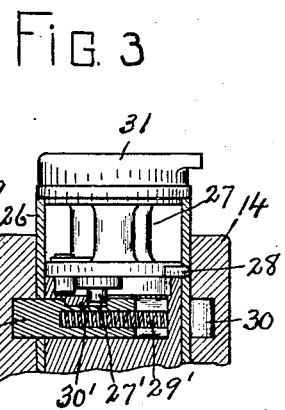
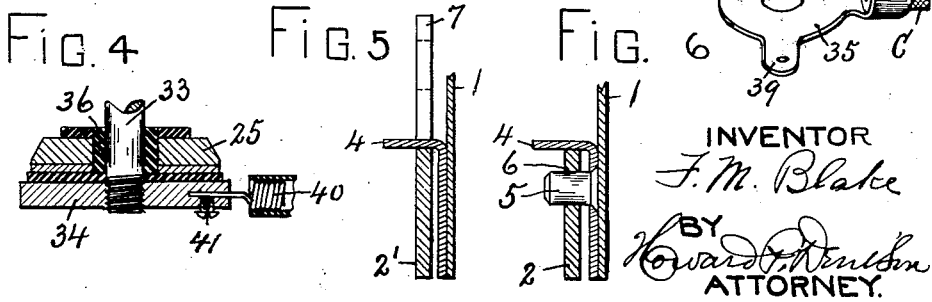
INVENTOR
F. M. Blake
BY
Howard F. Nelson
ATTORNEY.

Feb. 24, 1925. 1,527,625
F. M. BLAKE
SAFETY APPLIANCE FOR MOTOR VEHICLES
Filed Sept. 8, 1922 2 Sheets-Sheet 2
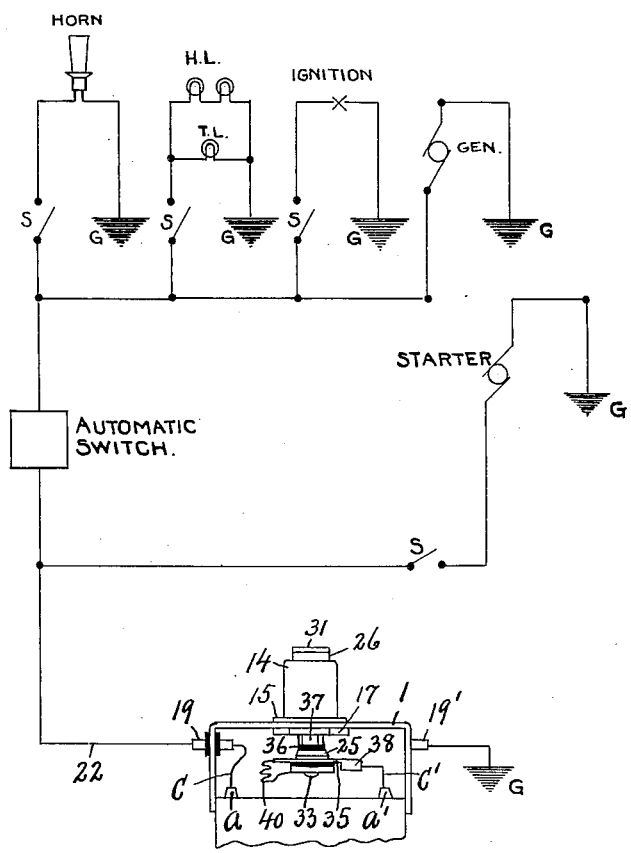

Patented Feb. 24, 1925.

1,527,625

UNITED STATES PATENT OFFICE.

FRED M. BLAKE, OF FULTON, NEW YORK.

SAFETY APPLIANCE FOR MOTOR VEHICLES.

Application filed September 8, 1922. Serial No. 586,822.

*To all whom it may concern:*

Be it known that I, FRED M. BLAKE, of Fulton, in the county of Oswego, in the State of New York, have invented new and useful Improvements in Safety Appliances for Motor Vehicles, of which the following, taken in connection with the accompanying drawings, is a full, clear, and exact description.

This invention relates to a safety appliance for motor vehicles of the class set forth in my pending applications, Serial No. 462,018, filed April 16, 1920; 517,096, filed November 22, 1921, and 568,681, filed June 16, 1922, the main difference being in the construction of the switch and the electrical connections between the battery and switch.

The main object is to secure greater safety against theft, fire from short circuits and battery leakage when the car is parked or housed and at the same time to protect the battery terminals from corrosion and contact with external objects.

In the use of storage batteries on motor vehicles for operating the various translating devices, one side of the battery and one side of each of the translating devices is usually grounded upon the engine frame, while in many machines, particularly in pleasure cars, an engine-driven dynamo or generator is commonly employed in connection with a suitable automatic cut-out for charging the battery and supplying current to the various translating devices when the battery is fully charged, and one of the specific objects of my present invention is to provide simple and efficient means, under the control of the operator, for opening and closing the grounded side of the battery circuit and thereby cutting out or cutting in all other parts of the circuit or circuits, including the several translating devices.

Another object is to provide the battery with a metallic cover and to support the switch mechanism entirely upon and within the cover in such manner as to reduce to a minimum the possibility of malicious closing of the switch when locked in its open position.

A further object is to utilize a portion of the switch in connection with a suitable locking device for locking the cover on the battery.

Other objects and uses relating to specific parts of the device will be brought out in the following description.

In the drawings: Figure 1 is an inverted plan of the detached cover, showing the position of the battery and the battery handles by dotted lines and the battery terminals by full lines.

Figure 2 is a transverse vertical sectional view taken in the plane of line 2—2, Figure 1.

Figure 3 is an enlarged detail sectional view of the upper portion of the switch-operating plunger and locking means therefor.

Figure 4 is an enlarged vertical sectional view of the movable switch member and other parts on the lower end of the plunger, showing also the adjacent end of the resistance member for the parking lights.

Figures 5 and 6 are enlarged detail sectional views taken respectively on lines 5—5 and 6—6, Figure 1.

Figure 7 is a perspective view of one of the detached switch plates, carrying the binding posts for one of the battery terminal cables and resistance wire for the parking lights.

Figure 8 is a diagrammatic view of the cut-out switch and several translating devices showing one way of connecting the switch in the several circuits.

The storage battery —A— shown by dotted lines in Figures 1 and 2, is provided with the usual terminals —a— and —a'— and couplings —c— and —c'— for connecting the cables as —C— and —C"— to the binding posts.

The top of the battery is enclosed in a suitable housing or cover —1— preferably of sheet steel or equivalent material, for protecting the battery terminals against moisture or contact with external objects and also for enclosing and protecting the switch mechanism presently described.

In order that the cover —1— may be properly secured to the top of the battery without exposing its securing means, a pair of sheet steel strips —2— and —2'— are secured by screws —3— or equivalent fastening means, to the outer faces of opposite sides of the battery case.

The corresponding sides of the cover —1— are provided above the lower edges thereof with entrant ledges —4— adapted to rest upon the upper edges of the bars —2— and —2'—, so as to hold the upper portion of the cover plate some distance above the upper terminals, —a— and —a'—, One side of the battery cover, adjacent to the ledge —4—, is provided with inwardly projecting lugs —5— adapted to enter registering apertures —6— in the adjacent bar —2— for locking that side of the cover to the corresponding side of the battery.

The opposite bar —2'— is provided with a central upwardly projecting extension —7—, having an aperture —8— for receiving the adjacent end of a horizontally movable locking bolt —9— which is movable in guide flanges —10— on the under side of the top of the cover —1— as shown in Figure 2, the outer end of said locking bolt being extended through an aperture —11— in the adjacent side of the cover, to assist in locking the cover to the battery.

A coil spring —12— surrounds the intermediate portion of the locking bolt —9— and has one end engaged with the inner flange —10— and its other end engaged with a shoulder —13— on the bolt, for yieldingly holding said bolt in locking engagement with the extension —7— of the bar —2'— and adjacent side of the cover.

A tubular boss —14— of suitable metal, is secured to and rises from the central portion of the top of the cover —1— and is provided with an outwardly projecting annular flange —15— resting upon the upper surface thereof, the lower end of said tubular boss being provided with an externally threaded extension —16— projecting through an opening in the cover and engaged by a nut —17— which also engages the underside of the adjacent portion of the cover for firmly clamping the tubular boss thereto.

A locking screw —18— is engaged from the underside in registering apertures in the lock nut —17— and top of the cover —1— and extends into a registering socket in the under side of the flange —15— of the tubular boss —14— to hold said nut and boss against turning movement relatively to the cover plate without in any way exposing the locking screw from the outside.

A pair of binding posts —19— and —19'— are secured respectively to opposite sides of the cover plate —1— below the top thereof and above the ledges —4—, one of said binding posts, as —19—, being insulated from the cover by suitable insulation —20—, while the binding post —19'— is in direct electrical connection with said cover.

The binding post —19— is electrically connected by a cable —C— to one of the battery terminals, as —a— wholly within the cover —1—, while the outer end of the same binding post is adapted to receive an external cable —22— for supplying current to the various translating devices.

The binding post —19'— is grounded to the frame of the engine by means of an external cable —23—, and through the medium of the cover plate —1— is electrically connected to the tubular boss —14—, which constitutes one of the members of the electric cut-out switch.

For this latter purpose the lower end of the tubular boss —14— within the cover plate —1— is provided with a central conical socket, forming a contact face —24— for cooperative contact with a movable switch member —25—, which also has a conical contact face adapted to be moved into and out of engagement with the contact face —24— of the tubular member —14— for making and breaking the circuit.

A plunger —26— is reciprocally movable vertically in the tubular boss —14— and has its upper end extended above the corresponding end of the boss and provided with a vertical socket for receiving a key controlled lock —27— which is held against relative endwise movement therein by key —28—, and is provided with a locking bolt —29— movable by a suitable key into and out of an internal annular groove —30— in the boss —14— some distance below the upper end thereof, said lock being provided with a key-hole in the top thereof, normally covered by laterally movable cap —31—, so that when the key is inserted in the lock and turned in one direction, it will withdraw the bolt —29— from the annular groove —30— against the action of a retracting spring —29'—, and allow the plunger to be moved upwardly by a retracting spring —32—. For this latter purpose the locking bolt —29— is provided in its upper side with a recess —30'— for forming opposite end shoulders adapted to be engaged by a key operated tumbler —27'— for withdrawing the bolt against the action of a spring —29'— (see Fig. 3).

The lower end of the plunger —26— is reduced in diameter to form a stem —33— which extends through a guide opening in the bottom of the boss —14— and has its lower end threaded and engaged by a nut —34—.

The movable switch member —25— is mounted upon the lower end of the stem —33— in direct electrical contact with an underlying switch plate —35—, which is also carried by the plunger stem —33—, but both of these members —25— and —35— are insulated from the plunger by insulation —36—, extending through registering openings in the members —25— and —35— and between the member —35— and nut —34—, the same insulation being interposed between the switch member —25— and a spacing sleeve —37— which is interposed between the enlarged upper end of the plunger —26— and upper end of the insulation —36—, which, together with the switch members —25— and —35— are tightly clamped between the lower end of the sleeve —37— and nut —34— as the latter is tightened.

The switch member or conducting plate —35— is provided with a binding post —38— to which is connected one end of a cable —C'— having its other end electrically connected to the battery terminal —a'— wholly within the cover plate.

The switch plate —35— is provided with an additional binding post —39— to which is connected one end of a resistance coil —40—, having its other end electrically connected by a binding post —41— to the nut —34—, thereby establishing an electrical resistance connection around the insulation —36— between the movable switch member and plunger —26—, which is in electrical contact with the boss —14— and therefore in electrical connection with the binding post —19'— through the cover plate —1—.

The object of this resistance by-pass connection —40— is to maintain a relatively low power battery current in the working circuits for energizing the parking lights, but of insufficient power to operate any of the other translating devices.

When the plunger —26— is depressed and locked in that position by the engagement of the locking bolt —29— in the annular groove —30—, the switch member —25— will be open, while the nut —34— will be brought into registration with the inner end of the cover-looking bolt —9— and in close proximity thereto to hold the last named bolt in its locking position, thereby preventing the removal of the cover plate from the battery, which in turn prevents access to the battery terminals and switch members,—that is, the opening of the switch cuts out the grounded side of the battery and thereby cuts out all of the translating devices except the resistance —40— which remains in circuit for energizing the parking lights.

The boss —14— and switch operating plunger —26— therein preferably extends through an opening in the floor board, as —B—, of the motor vehicle, so that the plunger may be depressed for locking the switch in an open position by simply stepping upon the upper end thereof, or it may be depressed by hand if desired, but in either case the closing of the switch by the upward movement of the plunger through the medium of the spring —32— is dependent upon the application of a suitable key to the lock —27— for withdrawing the bolt —29— from its locking position.

When the switch is closed by contacting of the member —25— with the contact face —24— of the boss —14—, all of the circuits through the several translating devices will be closed, and the locking bolt —9— for the cover plate —1— will be free to be moved inwardly by pressure against the outer end thereof against the action of the spring —12— until disengaged from the keeper-plate —7—, thus permitting the entire cover plate with the switch and locking mechanism thereon to be removed from the battery sufficient to permit access to the enclosed mechanism for repairs or adjustment, or for the refilling of the battery, the cables —C— and —C'— being flexible and of sufficient length to permit the displacement of the cover, but it is evident that after this displacement the cables may be disconnected from their respective battery terminals or binding posts, whereupon the cover may be entirely removed from connection with the battery and laid aside if necessary.

In Figure 7 I have shown a diagrammatic view of the several translating devices and circuits in which they are connected, together with portions of the battery, cover plate and electric switch controlling said circuits. The translating devices shown consist of "horn", "head lights" and "tail lights", represented respectively by "H. L." and "T. L.", "ignition", "generator" (indicated by "Gen.") and "starting motor" (indicated by "starter"), and also an automatic switch, usually connected in the battery and generator circuit for transferring the load to the generator when the engine is in operation, and for regulating the charging of the battery. In this diagrammatic view it will be observed that the cover plate —1— of the battery and several translating devices are grounded at —g— and that each of the translating devices, except the generator, is controlled by a separate switch —s— under the control of the operator.

The circuits as shown are from one of the battery terminals as —a—, cable —C—, binding post —19— and exterior cable —22— to the several translating devices, thence through the ground —g— through the cover plate —1—, contact face —24— of the post —14—, and when the switch is closed, through the switch members —25— and —35— and cable —C'— to the other terminal —a'— of the battery.

When the switch member —25— is open, current passes through the same conductors to the switches of the several translating devices, returning through the ground —g— to the case —1—, post —14—, plunger —26—, nut —34— in electrical connection with said plunger and thence through resistance coil —40— to the switch plate —35— and return by the cable —C'— to the other terminal of the battery.

As previously stated this resistance —40— is selected and adjusted to produce a glow in the lights "H. L." and "T. L." when the corresponding switch —s— is closed, but is insufficient to operate any of the other translating devices, or even to produce intense illumination of the lamps "H. L." and "T. L.", which are then used only for parking purposes.

It will be noted that the switch mechanism, including the locking devices for the switch and cover plate and also the cables between the switch and battery terminals and binding posts are all concealed within and protected by the cover plate, with the exception of the outer end of the locking bolt —9— of the cover plate, which however, is automatically locked in its closed position by the nut —34— on the inner end of the plunger —26—, thus making it practically impossible to remove the cover until the switch operating plunger is released by the application of a suitable key to its lock, at which time the circuit leading to the several translating devices is closed by the engagement of the member —25— with the contact face —24—.

What I claim is:

1. The combination with a storage battery, and an external working circuit having a plurality of translating devices therein, of a cover plate of electric conducting material mounted on the battery and enclosing the terminals thereof, binding posts on the cover plate, one of which is insulated therefrom and connected to the external circuit for supplying current thereto the other binding post being in electrical connection with the cover plate and grounded, a cable connecting one of the battery terminals to the insulated binding post wholly within the cover plate, an electric switch having its contact faces wholly within the cover plate, one of the switch members being in electrical connection with the cover plate and the other switch member being electrically connected to said other battery terminal.

2. The combination with a storage battery, of a cover plate of electric conducting material mounted on the battery and enclosing the terminals thereof, binding posts on the cover plate, one of which is insulated therefrom and provided with means for connection with an external grounded circuit, the other binding post being in electrical connection with the cover plate and grounded, a cable connecting one of the battery terminals to the insulated binding post wholly within the cover plate, an electric switch having its contact faces wholly within the cover plate, one of the switch members being in electrical connection with the cover plate and the other switch member being electrically connected to the other battery terminal, a movable member for locking and releasing the cover plate in and from its closed position and means movable in unison with the switch member for preventing the unlocking movement of the locking member when the movable switch member is open and for permitting the unlocking movement of said locking member when the switch member is closed.

3. In combination with a storage battery, a cover plate of electric conducting material mounted on the battery and enclosing the terminals thereof, a binding post mounted on the cover plate but insulated therefrom and electrically connected to one of the terminals of the battery, said binding post being provided with means for connection with an external grounded circuit; an additional binding post mounted on the cover plate in electrical connection therewith and provided with means for receiving a grounded connection and an electric switch within the cover plate having one of its members in electrical connection therewith and its other member in electrical connection with the other battery terminal.

4. In combination with a storage battery, a cover plate of electric conducting material mounted on the battery and enclosing the terminals thereof, a binding post mounted on the cover plate but insulated therefrom and electrically connected to one of the terminals of the battery, said binding post being provided with means for connection with an external grounded circuit; an additional binding post mounted on the cover plate in electrical connection therewith and provided with means for receiving a grounded connection and an electric switch within the cover plate having one of its members in electrical connection therewith and its other member in electrical connection with the other battery terminal, a conducting member secured to the last named switch member but insulated therefrom and an electrical resistance electrically connected to the last named switch member and to said conducting member.

5. The combination with a storage battery, and an external working circuit including therein a plurality of grounded translating devices and controlling means therefor of a grounded cover plate of electric conducting material mounted on the battery and enclosing the battery terminals, a switch member secured to the battery plate in electrical connection therewith, a cooperative switch member within the cover plate movable into and out of engagement with the first named switch member, operating means for the movable switch member extending to the exterior of the cover plate, electrical connections between the movable switch member and one of the battery terminals wholly within the cover plate, and a binding post mounted on the cover plate but insulated therefrom and electrically connected to the other battery terminal and electrically connected to the external circuit to supply current thereto.

6. The combination with a storage battery and an external circuit including therein a plurality of grounded translating devices and controlling means therefor, of a grounded cover plate of electric conducting material mounted upon the battery and enclosing the terminals thereof, electrical connections between the cover plate and one of the battery terminals wholly within said cover plate and including an electric switch for making and breaking connection between said battery terminal and cover plate, a binding post mounted on the cover plate but insulated therefrom and electrically connected with the external circuit for supplying current thereto and electrical connections between the binding post and the other battery terminal wholly within the said cover plate.

7. The combination with a storage battery and an external circuit including therein a plurality of translating devices and controlling means therefor, of a grounded cover plate of electric conducting material mounted on the battery and enclosing the terminals thereof, electrical connections between one of the battery terminals and cover plate wholly within said cover plate and including an electric switch, means controlled by the movable member of said switch when opened for locking the cover plate to the battery, a binding post mounted on the cover plate but insulated therefrom and electrically connected to the external circuit for supplying current thereto and electric connections between said insulated binding post and the other battery terminal wholly within the cover plate.

8. A safety appliance for motor vehicles comprising in combination with a storage battery having a casing inclosing its terminals, said casing including an electrically grounded metallic cover, a plurality of electrically "grounded" translating devices electrically connected to one of the terminals of the battery, and an electric switch mounted on the cover wholly within the casing and having one of its member electrically connected to said cover and its other member movable and electrically connected to the other battery terminal for grounding that terminal when the switch is closed, and for breaking the battery circuits through the translating devices when the switch is opened.

9. A safety appliance for motor vehicles comprising in combination with a storage battery, a plurality of electrically "grounded" translating devices electrically connected to one of the terminals of the battery for receiving current therefrom, an electrically grounded switch electrically connected to the other terminal of the battery for grounding the battery when the switch is closed and for breaking the battery circuits through the translating devices when the switch is opened, and means for maintaining a relatively low voltage electrical connection between the movable switch member and the ground when the switch is opened.

In witness whereof I have hereunto set my hand this 29th day of August, 1922.

FRED M. BLAKE.

Witnesses:
H. E. CHASE,
F. L. SANDERS.